United States Patent

Burkart

[15] 3,651,574

[45] Mar. 28, 1972

[54] APPARATUS FOR PLOTTING AND MEASURING COURSES ON MAPS

[72] Inventor: Ronald F. Burkart, 3101 Shenandoah, Charlotte, N.C. 28205

[22] Filed: Aug. 3, 1970

[21] Appl. No.: 60,522

[52] U.S. Cl. ............................. 33/1 SB, 33/76 VA, 33/138
[51] Int. Cl. ............................................. A47b 85/02
[58] Field of Search ............ 33/1 MP, 1 SD, 1 SB, 138, 137, 33/76, 76 VA, 1 LE

[56] References Cited

UNITED STATES PATENTS

| | | | |
|---|---|---|---|
| 1,638,914 | 8/1927 | Brush | 33/76 R |
| 3,082,534 | 3/1963 | Susikari | 33/138 E X |
| 3,269,015 | 8/1966 | Barker | 33/138 X |
| 3,533,164 | 10/1970 | Bloom | 33/138 X |
| 3,568,319 | 3/1971 | Moll | 33/138 X |

*Primary Examiner*—William D. Martin, Jr.
*Attorney*—Parrott, Bell, Seltzer, Park & Gibson

[57] ABSTRACT

An apparatus for plotting and measuring courses on maps between points of departure and destination including a base having reference means for alignment with an edge of the map and arm means slidably and adjustably mounted on the base. A compass rose is rotatably and adjustably mounted on the arm for positioning relative to the point of departure and the directional orientation of the map. A retractable rule means is independently mounted for rotation about the axis of rotation of the compass rose and is retractably extendible radially thereof from the point of departure to the point of destination for indicating the distance and direction between the points of departure and destination.

11 Claims, 8 Drawing Figures

Patented March 28, 1972
3,651,574
2 Sheets-Sheet 1
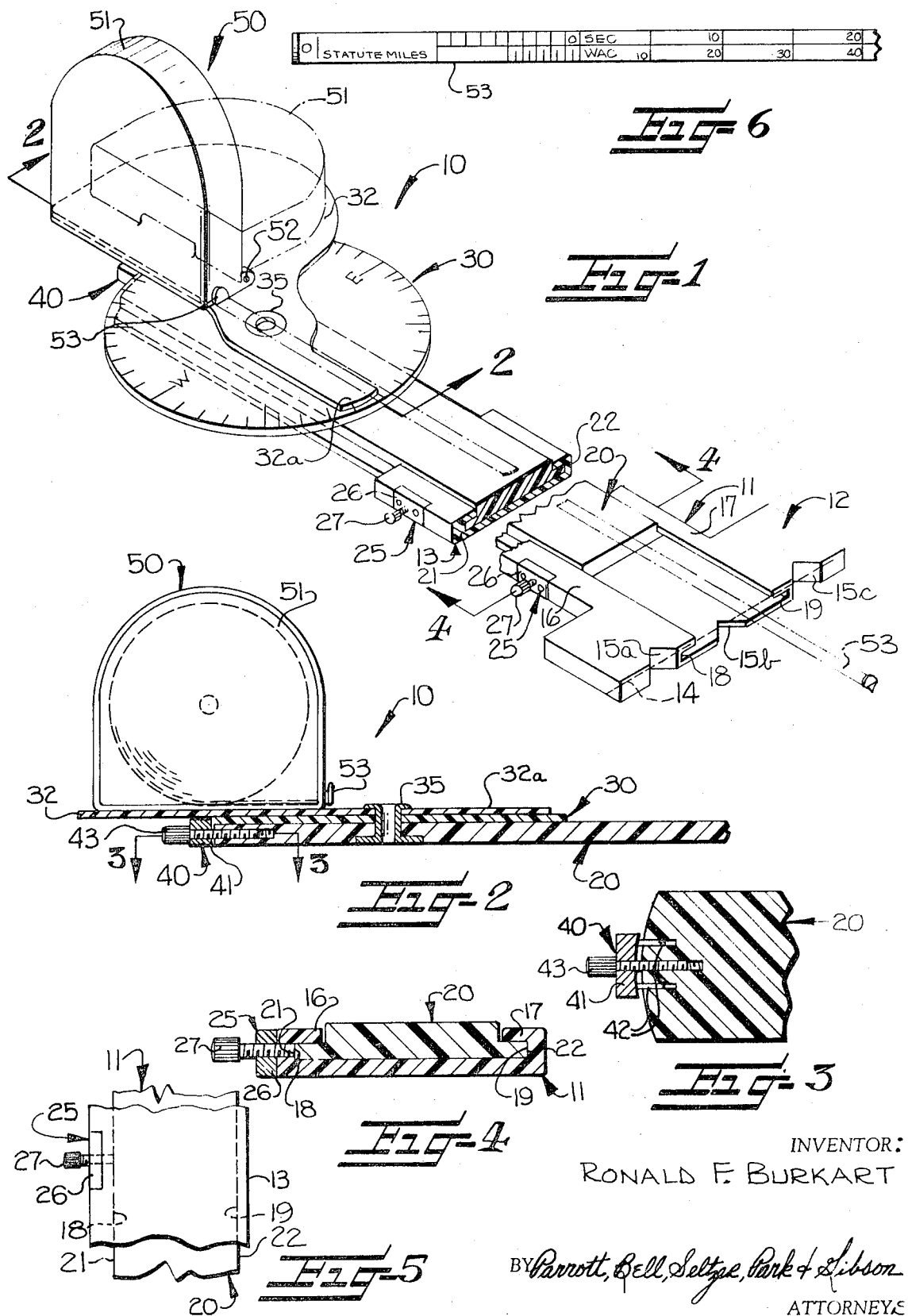
INVENTOR:
RONALD F. BURKART
BY Parrott, Bell, Seltzer, Park & Gibson
ATTORNEYS

INVENTOR:
RONALD F. BURKART

BY Parrott, Bell, Seltzer, Park & Gibson
ATTORNEYS

APPARATUS FOR PLOTTING AND MEASURING COURSES ON MAPS

This invention relates to an apparatus for plotting and measuring courses between points of departure and destination on navigational maps such as aeronautical charts and the like. More particularly, the apparatus is capable of use on maps having the points of departure and destination on one side and on two-sided maps that are continuous about a common edge wherein the point of departure is on one side of the map and the point of destination is on the other side.

It is conventional practice for a navigator of a craft such as an aircraft, ship or the like, to graphically plot and measure a course between points of departure and destination on navigational charts to facilitate in directing the craft between the two points. This graphical plotting normally includes a determination of the direction in which to travel from the point of departure to the point of destination and the distance to be traveled in that direction.

Heretofore, the above plotting and measuring of courses between points of departure and destination have been performed with a variety of instruments and apparatus. However, these instruments or apparatus have been cumbersome, inaccurate, etc. No previous apparatus or instrument has been generally available for easily and readily plotting and measuring courses on maps between points of departure and destination.

Thus, it is an object of the present invention to provide an improved apparatus to assist a navigator in graphically determining from maps the course to be taken between a point of departure and a point of destination and the distance to be traveled therebetween.

It is another object of the present invention to provide an apparatus for the simultaneous determination from maps the direction and distance to be traveled between a point of departure and a point of destination in an accurate and reliable manner without the need of additional apparatus and/or the making of calculations.

Furthermore, it is an object of the present invention to provide an apparatus for determining the course and distance to be traveled between points of departure and destination on navigational maps that are continuous about a common edge wherein the point of departure is on one side of the map and the point of destination is on the other side of the map.

Briefly, the objects of the present invention are accomplished in this invention by providing an apparatus comprising a base having reference means for alignment thereof with an edge of the map, and arm means carried by the base and being slidably mounted for adjustable movement relative thereto. A compass rose means is rotatably mounted on the arm means and movable therewith for positioning the axis of rotation thereof in overlying relation to the point of departure on the map and is releasably securable in a predetermined rotated position relative to the directional orientation of the map. A retractable rule means is independently mounted for rotation about the axis of rotation of the compass rose and is retractably extendible radially of the compass rose to the point of destination. The retractable rule means cooperates with and registers with the compass rose for indicating the distance and direction to be traveled between the points.

Some of the objects of the invention having been stated, other objects will appear as the description proceeds when taken in connection with the accompanying drawings, in which:

FIG. 1 is a schematic perspective view with portions broken away of an apparatus constructed in accordance with the present invention;

FIG. 2 is an enlarged sectional view taken substantially along the line 2—2 of FIG. 1;

FIG. 3 is a sectional view taken substantially along the line 3—3 of FIG. 2;

FIG. 4 is an enlarged sectional view taken substantially along the line 4—4 of FIG. 1;

FIG. 5 is an enlarged bottom plan view of a portion of the apparatus of FIG. 1 and illustrates the means for releasably securing the arm in a predetermined adjusted relation to the base;

FIG. 6 is an enlarged view of a portion of the rule blade of the retractable rule and illustrates measuring indicia thereon.

Figure 7:
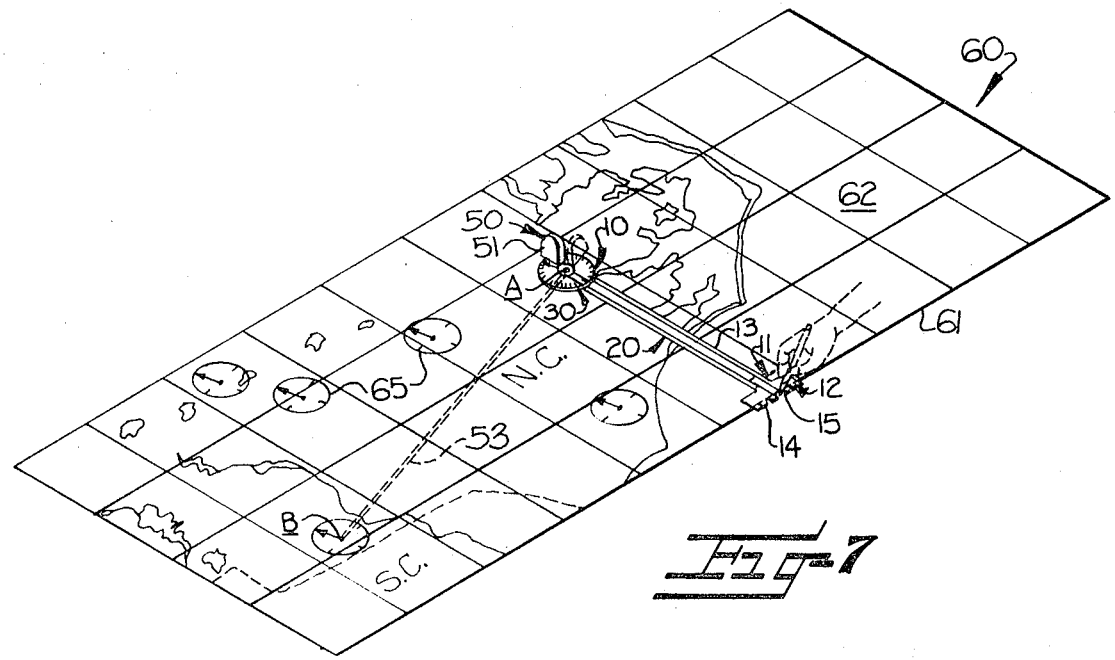
FIGS. 7 and 8 are schematic perspective views of opposite sides of a sectional aeronautical chart that is continuous about a common edge and illustrates use of the apparatus of the present invention therewith.

Referring now specifically to the various figures wherein like reference characters are employed to indicate like parts, there is illustrated in FIGS. 1–6 an apparatus, generally indicated at 10 and constructed in accordance with the present invention. As best shown in FIG. 1, the apparatus 10 comprises a base 11 having a crossbar portion 12 and an elongate body portion 13 which are interconnected to form a generally T-shaped configuration.

The crossbar portion 12 has reference indicia disposed longitudinally thereof to facilitate alignment of the base 11 with an edge of a map, such as a navigational chart. Preferably, the base 11 is formed of a transparent plastic material with the reference indicia being in the form of a linear score line 14. Due to the transparency of the base 11, the score line 14 may be readily aligned with an edge of a map. In addition, three V-shaped notches or grooves 15a, 15b, 15c, are preferably formed in the edge of the crossbar portion 12 and have the apices thereof reaching the score line 14 for reasons to be hereinafter explained.

The crossbar portion 12 and elongate body portion 13 of the base 11 has flanges 16 and 17 thereof undercut to form opposing longitudinal grooves 18 and 19, respectively, which define a trackway that extends longitudinally of the base 11.

An elongate arm 20 also preferably formed from a transparent plastic material has the opposite longitudinal side edges 21 and 22 thereof received in grooves 18 and 19, as illustrated in FIG. 1, to mount arm 20 on the base 11 for sliding movement longitudinally thereof. Thus, arm 20 may be adjustably positioned relative to base 11 and due to the cooperation of arm 20 with base 11, arm 20 may be positioned to form an adjustable extension of base 11.

Means, generally indicated at 25, are provided at spaced intervals along the elongate body portion 13 of base 11, each of which cooperates with the body portion 13 and arm 20 for releasably securing the arm 20 in a predetermined adjusted relation to the base 11.

With reference to FIGS. 1, 4 and 5, the securing means 25 are in the form of clamps and comprise an inverted L-shaped support or reinforcing member 26 permanently secured by suitable means such as screws or the like to the elongate body portion 13 of base 11. A clamp or set screw 27 is threadably received through reinforcing member 26 and the flange 16 to communicate with the groove 18 formed therein. Thus, upon threading set screw 27 inwardly, the same will engage edge 21 of arm 20 and force the opposing edge 22 into pressing or frictional engagement with flange 17 to secure arm 20 in a predetermined adjusted position relative to base 11. As will be apparent, by unscrewing set screw 27, arm 20 is released for free adjustable positioning thereof in another predetermined position.

On the extendible end of the arm 20, remote from the crossbar portion 12 of the base 11, there is rotatably mounted a compass rose 30 which is provided with indicia markings thereon concentric of the axis of rotation for indicating north (N), south (S), east (E), and west (W), and directions therebetween. The compass rose 30 is also preferably formed of a transparent plastic material. In superimposed relation to the compass rose 30, there is mounted a planar support member 32 for rotation independently about the axis of rotation of the compass rose 30. As best illustrated in FIG. 2, the compass rose 30 and support member 32 are mounted on arm 20 by a hollow pivot 35 which provides for rotation of compass rose 30 relative to arm 20 and rotation of support member 32 independently of the compass rose 30 about the axis of rotation of the compass rose 30. The hollow pivot 35 also provides an opening through the support member 32, compass rose 30 and arm 20 so that the axis of rotation of the compass rose 30 may be readily disposed in overlying relation to designated points on a map. In this regard, the transparency of the compass rose 30 and arm 20 further facilitates the disposing of the axis of rotation of the compass rose 30 in overlying relation to designated points on a map.

For reasons to be hereinafter explained, it is desirable that the compass rose 30 be releasably securable in a predetermined adjusted relation to arm 20. With reference to FIGS. 1-3, such releasable securing means is generally indicated at 40 and is carried by the end of the arm 20 adjacent compass rose 30. The securing means 40 comprises an abutment member 41 having an abutting surface for matingly engaging the outer edge of the compass rose 30 and spaced apart guide bars 42 which are received in respective receiving grooves in arm 20 for guiding movement substantially radially of the axis of rotation of the compass rose 30. A clamping screw 43 is loosely received in an opening in abutment member 41 and threadably received in arm 20. Upon threading screw 43 inwardly into arm 20, the abutting surface of abutment member 41 is brought into pressing or abutting engagement with the edge of compass rose 30 and secures the same in a predetermined adjusted relation to arm 20. As will be apparent, by loosening screw 43 the pressure of abutting member 41 is released from compass rose 30 such that compass rose 30 may be rotated as desired to another predetermined adjusted position relative to arm 20.

As noted in FIG. 1, support member 32 includes a marker or pointer 32a which has an edge that extends radially of the axis of rotation of the compass rose 30 and registers with the direction indicia on the compass rose 30 for indicating the orientation of the support member 32 to the compass rose 30. In diametrically opposed relation to the pointer 32a and eccentrically of the axis of rotation of the compass rose 30, there is mounted retractable rule means, generally indicated at 50. The retractable rule means 50 comprises a rule housing 51 which is mounted by hinge 52 for pivoting movement between an operative position (full lines) and an inoperative position (phantom lines). A rule blade 53 is mounted in the rule housing 51 and is retractably extendible outwardly therefrom.

As illustrated in FIGS. 1 and 2, the rule housing 51 is mounted on the support member 32 such that when the rule housing 51 is in the operative position, the rule blade 53 is retractably extendible therefrom radially across the compass rose 30 in such a manner that one edge thereof registers with the compass rose 30 for indicating the orientation of the rule blade 53 to the compass rose 30. With reference to FIG. 6, the rule blade 53 preferably has measuring indicia markings thereon which correspond in scale to that of the map with which the apparatus 10 is to be used. The rule blade 53 in FIG. 6 includes two scales, both of which are graduated in statute miles. As indicated, one of the scales is for use on Sectional Aeronautical Charts (SAC) and the other for use on World Aeronautical Charts (WAC). It will be apparent that the measuring indicia markings on the rule blade 53 may be readily altered to suit the use to which the apparatus 10 is to be put.

Figure 8:
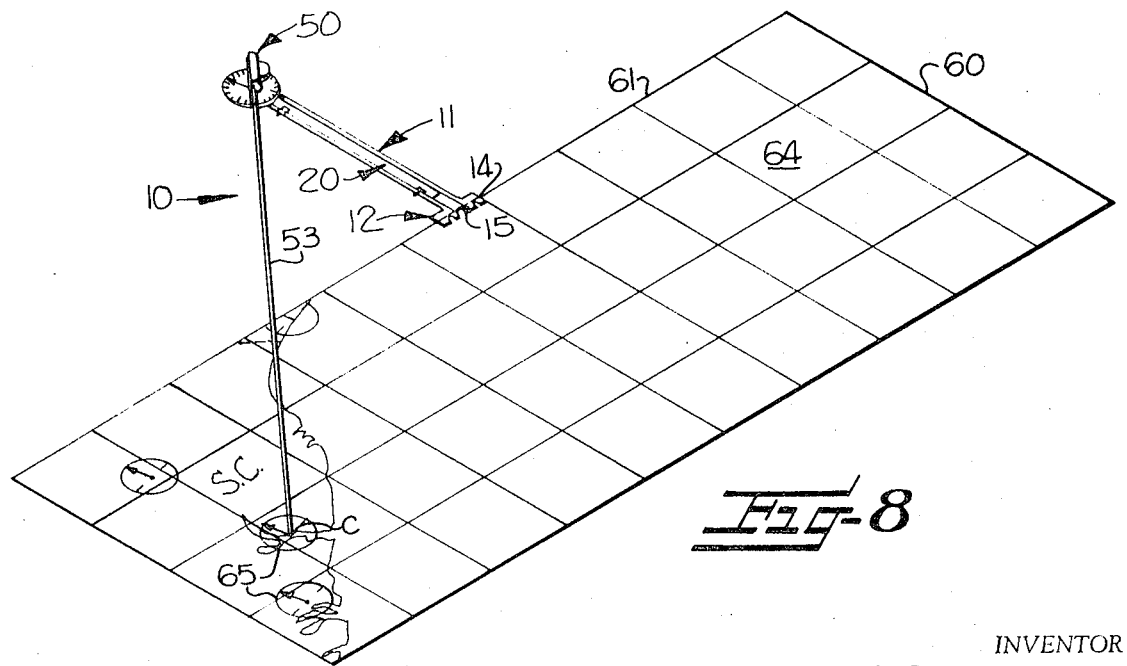

Referring specifically to FIGS. 7 and 8, operation of the apparatus 10 will now be described for plotting and measuring courses between points of departure and destination. In these figures, a two-sided Sectional Aeronautical Chart, generally indicated at 60, is continuous about a common edge 61 and has opposite sides 62 and 64. The particular Sectional Aeronautical Chart here illustrated is for Charlotte and thus encompasses portions of the states of North Carolina (N.C.) and South Carolina (S.C.). At various locations on the chart 60, compasses 65 are provided to indicate the directional orientation of the chart 60.

First, let us assume that it is desirable to plot and measure a course from a point of departure, point A, to a point of destination, point B, both of which are on one side 62 of chart 60. The score line 14 on the crossbar portion 12 of base 11 is aligned on the common edge 61 of chart 60 with the elongate body portion 13 extending in overlying relation to the one side 62 of the chart 60. The base 11 is shifted along the common edge 61 and the arm 20 adjusted relative thereto until the compass rose 30 has the axis of rotation thereof centered over a compass 65. The compass rose 30 is then rotated until north (N) of the compass rose 30 coincides with north (N) of the compass 65 and screw 43 tightened to secure the compass rose 30 in the adjusted position. Then the base 11 is shifted along the common edge 61 with score line 14 maintained in alignment therewith and the arm 20 adjusted relative to base 11 until the compass rose 30 has the axis of rotation thereof centered over the point of departure, point A. Screws 27 are tightened to secure the arm 20 in the adjusted position and the base 11 manually held in place.

With the rule housing 51 in the operative position, the rule blade 53 is extended and the rule housing 51 rotated, as illustrated in phantom lines in FIG. 7, such that the rule blade 53 extends to the point of destination, point B. The direction to be traveled between the point of departure and point of destination is read directly from the registering relation of the rule blade 53 and/or pointer 32a with the compass rose 30, and the distance to be traveled between the points is read directly from the point on the rule blade 53 disposed over the axis of rotation of the compass rose 30.

Now let us assume that it is desirable to plot and measure a course from the same point of departure, point A, on one side 62 of the chart 60 to another point of destination, point C, which is on the other side 64 of the chart 60. As before, the compass rose 30 is preadjusted to coincide with the directional orientation of the chart 60. The apparatus 10 is then positioned, as shown in FIG. 7, with the axis of rotation of the compass rose 30 in overlying relation to the point of departure, point A, the score line 14 aligned with the common edge 61 and the arm 20 secured relative to base 11. The common edge 61 of the chart 60 is nicked, ticked or otherwise marked at the apex of the groove 15 in the crossbar portion 12 of base 11, FIG. 1.

The apparatus 10 is then removed from the chart 60 and the chart 60 turned over. The apparatus 10 is now positioned as in FIG. 8 with the score line 14 aligned with the common edge 61, and the nick, tick or other mark made on the common edge 61 coincident with the groove 15 in the crossbar portion 12 of base 11, and the elongate portion 13 of the base 11 extending outwardly from the common edge 61. With the rule housing 51 in the operative position, the rule blade 53 is extended and the rule housing 51 rotated such that the rule blade 53 extends to the point of destination, point C. As before, the direction to be traveled between the point of departure, point A, and the point of destination, point C, is read directly from the registering relation of the rule blade 53 and/or pointer 32a with the compass rose 30 and the distance to be traveled between the points is read directly from the point on the rule blade 53 disposed over the axis of rotation of the compass rose 30.

It will be seen from the foregoing description that the apparatus 10 is readily suited for use on maps having the point of departure and the point of destination on one side or on two-sided maps that are continuous about a common edge wherein the point of departure is on one side and the point of destination is on the other side. The apparatus 10 provides for the simultaneous determination of the direction to be traveled between a point of departure and a point of destination and the distance to be traveled in that direction. The formation of at least the bulk of the apparatus 10 from a transparent material and the inclusion of the opening formed by the hollow pivot 35 facilitate easy alignment of the axis of rotation of the compass rose 30 in overlying relation to the point of departure on the map. In addition, the construction of base 11 and arm 20 and their cooperation provide for easy and accurate operation of the apparatus 10. Furthermore, the apparatus 10 is compact in that the rule blade 53 is retractable into the rule housing 51, the rule housing 51 may be positioned in an inoperative compact position and the arm 20 may be adjustably positioned relative to base 11 in a compact manner.

In the drawings and specification there has been set forth a preferred embodiment of the invention and, although specific terms are employed, they are used in a generic and descriptive sense only and not for purposes of limitation.

What is claimed is:

1. An apparatus for plotting and measuring courses between points of departure and destination on maps such as aeronautical charts, comprising
    a base having reference means for alignment thereof with an edge of the map,
    arm means carried by said base and being slidably mounted for adjustable movement relative thereto,
    a compass rose means rotatably mounted on said arm means and movable therewith for positioning the axis of rotation thereof in overlying relation to the point of departure on the map and including means for releasably securing said compass rose means in a predetermined rotated position on said arm means relative to the directional orientation of the map, and
    retractable rule means mounted on said compass rose means for independent rotation about the axis of rotation of said compass rose means and being retractably extendible radially of said compass rose means to the point of destination for cooperating with and registering with said compass rose means to indicate the distance and direction between the points of departure and destination.

2. An apparatus, as set forth in claim 1, including means for releasably securing said arm means in a predetermined adjusted relation to said base.

3. An apparatus, as set forth in claim 1, wherein said base is elongate and said reference means is disposed transversely adjacent one end thereof so that said base may be disposed in overlying relation to the map upon alignment of said reference means with an edge of the map, and wherein said arm means is mounted for sliding movement longitudinally of said base.

4. An apparatus, as set forth in claim 3, wherein said elongate base includes trackway means extending longitudinally thereof, and wherein said arm means is slidably mounted in said trackway means at generally one end thereof.

5. An apparatus, as set forth in claim 4, wherein said compass rose is mounted generally at the other end of said arm means.

6. An apparatus for plotting and measuring course between points of departure and destination on maps such as aeronautical charts, comprising
    a base having reference means for alignment thereof with an edge of the map,
    arm means carried by said base and being slidably mounted for adjustable movement relative thereto and including means for releasably securing said arm means in a predetermined adjusted relation to said base,
    a compass rose means rotatably mounted on said arm means and movable therewith for positioning the axis of rotation thereof in overlying relation to the point of departure on the map and including means for releasably securing said compass rose means in a predetermined rotated position on said arm means relative to the directional orientation of the map,
    a rule housing mounted eccentrically on said compass rose means for independent rotation about the axis of rotation of said compass rose means, and
    a rule blade mounted in said housing and being retractably extendible radially of said compass rose means to the point of destination for cooperating with and registering with said compass rose means to indicate the distance and direction between the points of departure and destination.

7. An apparatus, as set forth in claim 6, including means mounting said rule housing for pivoting movement between an operative position when using said apparatus and an inoperative compact position when not using said apparatus.

8. An apparatus, as set forth in claim 6, including a support member mounted in superimposed relation to said compass rose means for independent rotation about the axis of rotation of said compass rose means and having pointer means registering with said compass rose means radially thereof, and wherein said retractable rule housing is mounted on said support member eccentrically of said axis of rotation in diametrically opposed relation to said pointer means.

9. An apparatus, as set forth in claim 6, wherein said arm means and compass rose means are formed of a transparent material to facilitate the registering of the axis of rotation of said compass rose means in overlying relation to the point of departure on the map.

10. An apparatus, as set forth in claim 6, wherein said compass rose means and said arm means include an opening disposed axially therethrough to facilitate the registering of the axis of rotation of said compass rose means in overlying relation to the point of departure on the map.

11. An apparatus for plotting and measuring courses between points of departure and destination on maps such as aeronautical charts and being characterized by its ability to plot and measure courses on two-sided maps that are continuous about a common edge wherein the point of departure is on one side and the point of destination is on the other side of the map, said apparatus comprising,
    an elongate base having a trackway extending longitudinally thereof and reference means disposed transversely adjacent one end thereof for alignment with the common edge of the map,
    elongate arm means slidably mounted at generally one end thereof in said trackway of said base for adjustable positioning thereof relative to said base and including means for releasably securing said arm means in predetermined adjusted relation to said base,
    a compass rose means rotatably mounted on generally the other end of said arm means and movable therewith for positioning the axis of rotation thereof in overlying relation to the point of departure on the map and including means for releasably securing said compass rose means in a predetermined rotated position on said arm means relative to the directional orientation of the map,
    a rule housing mounted eccentrically on said compass rose means for independent rotation about the axis of rotation of said compass rose means, and including means mounting said rule housing for pivoting movement between an operative position and an inoperative compact position, and
    a rule blade mounted in said housing and being retractably extendible radially of said compass rose means to the point of destination for cooperating with and registering with said compass rose means to indicate the direction between the points of departure and destination.

* * * * *